(12) United States Patent
Tai

(10) Patent No.: US 8,739,606 B2
(45) Date of Patent: Jun. 3, 2014

(54) GAS TIGHTNESS TESTING MEMBER AND ELECTRONIC DEVICE HAVING THE SAME

(75) Inventor: Kuang-Cheng Tai, Hsinchu County (TW)

(73) Assignee: Getac Technology Corporation, Hsinchu County (TW)

( * ) Notice: Subject to any disclaimer, the term of this patent is extended or adjusted under 35 U.S.C. 154(b) by 245 days.

(21) Appl. No.: 13/243,375

(22) Filed: Sep. 23, 2011

(65) Prior Publication Data

US 2012/0272723 A1   Nov. 1, 2012

(30) Foreign Application Priority Data

Apr. 29, 2011   (CN) .......................... 2011 1 0117362

(51) Int. Cl.
*G01M 3/04* (2006.01)
(52) U.S. Cl.
USPC ........................... 73/40; 361/679.01; 361/799
(58) Field of Classification Search
USPC .................................. 73/40; 361/679.01, 799
See application file for complete search history.

(56) References Cited

U.S. PATENT DOCUMENTS

| | | | | |
|---|---|---|---|---|
| 2,432,257 | A * | 12/1947 | Stetzer | 52/472 |
| 3,351,813 | A * | 11/1967 | Trout | 361/50 |
| 6,181,550 | B1 * | 1/2001 | Kim | 361/679.06 |
| 7,088,592 | B2 * | 8/2006 | Su et al. | 361/753 |
| 2002/0152801 | A1 * | 10/2002 | Burke et al. | 73/49.8 |
| 2005/0223780 | A1 * | 10/2005 | Brewer | 73/49.1 |
| 2008/0083267 | A1 * | 4/2008 | Pampinella et al. | 73/49.1 |
| 2009/0308139 | A1 * | 12/2009 | Fox | 73/40 |
| 2011/0132075 | A1 * | 6/2011 | Arvaneh | 73/40.7 |

FOREIGN PATENT DOCUMENTS

CN    1534209 A    10/2004

\* cited by examiner

*Primary Examiner* — Lisa Caputo
*Assistant Examiner* — Philip Cotey

(57) ABSTRACT

A gas tightness testing member disposed in an electronic device includes a first end, a second end, and a fluid channel penetrating from the first end to the second end. The second end of the gas tightness testing member is combined with the electronic device, and the first end is connected to a gas tightness testing device for performing a gas tightness test.

15 Claims, 9 Drawing Sheets

GAS TIGHTNESS TESTING MEMBER AND ELECTRONIC DEVICE HAVING THE SAME

BACKGROUND

1. Technical Field

The present disclosure relates to an electronic device, and more particularly to an electronic device having a gas tightness testing member.

2. Related Art

Ruggedized notebook may be operated in a harsh environment (for example, in desert, under sunlight, or in a damp environment). Therefore, some ruggedized computers require good gas tightness and inhibition of electromagnetic interference.

In order to inhibit the electromagnetic interference, the ruggedized notebook would include a ground stud connected to an external ground wire in series for conducting a ground loop, thereby guiding a surge of the ruggedized notebook to the ground wire. Therefore, the electromagnetic interference to the ruggedized notebook is shielded off.

In addition, before shipment, gas tightness tests to some ruggedized notebooks are required. In the gas tightness test, in order to generate a pressure difference between the interior and the exterior of ruggedized notebook, at least one air vent is formed on the ruggedized notebook for connecting the gas tightness tester. For example, the air vent is formed by partially damaging the ruggedized notebook. However, the air vent may require the destroying of the ruggedized notebook. After the gas tightness test, the air vent is sealed. The inventors recognize that it is urgent for people in the industry to solve the problem of how to simplify the gas tightness testing process.

SUMMARY

In an embodiment, a gas tightness testing member comprises a main body and a cover body. The main body has a first end and a second end. The main body is conductive and combined with a casing. The main body has a fluid channel penetrating from the first end to the second end and communicating with the interior of the casing. The cover body is selectively combined with the first end of the main body for sealing the fluid channel.

In another embodiment, an electronic device comprises a casing and a gas tightness testing member. An electronic circuit device is disposed in the casing which has a ground loop electrically connected to the casing. The casing has at least one disposition hole. The gas tightness testing member is combined with the disposition hole, and comprises a main body and a cover body. The main body has a first end and a second end, is conductive and connected to the disposition hole. The main body has a fluid channel penetrating from the first end to the second end and communicating with an interior of the casing. The first end is connected to a ground wire for forming an electrical connection with the ground loop. The cover body is selectively combined with the first end of the main body, so as to seal the fluid channel.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
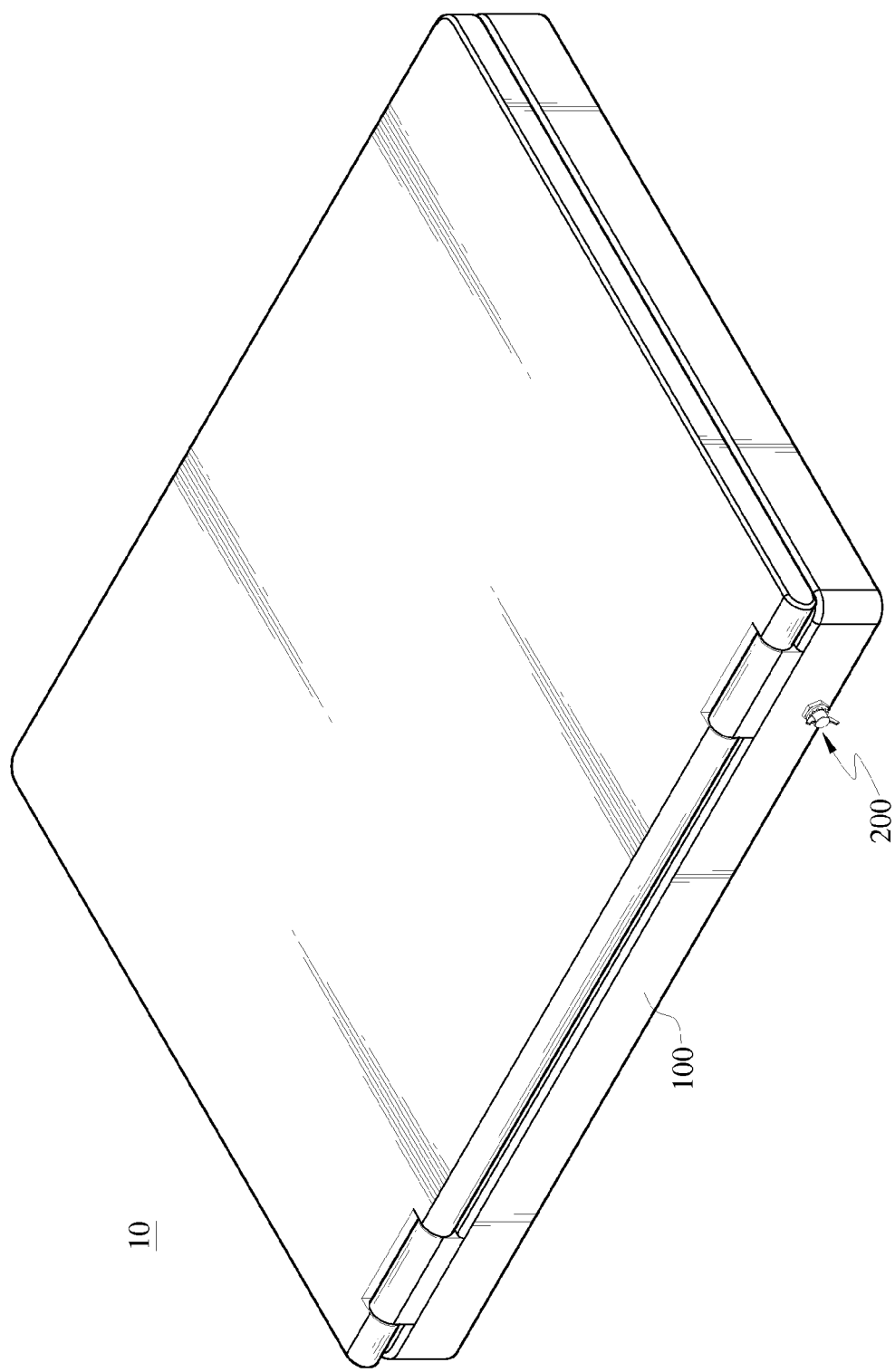
FIG. 1 is a three-dimensional view of an electronic device according to a first embodiment.
Figure 2:
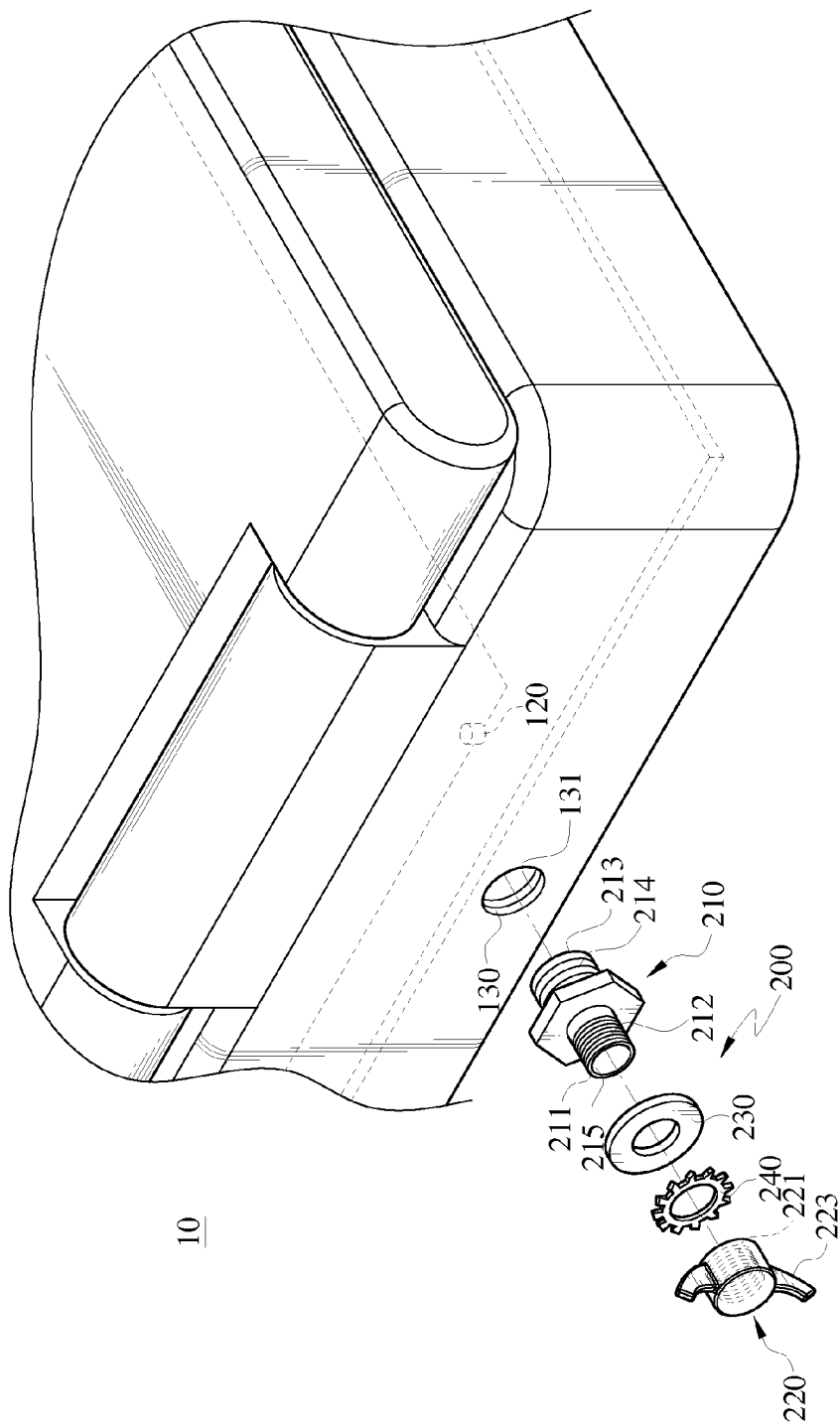
FIG. 2 is an exploded view of a gas tightness testing member according to the first embodiment.
Figure 3:
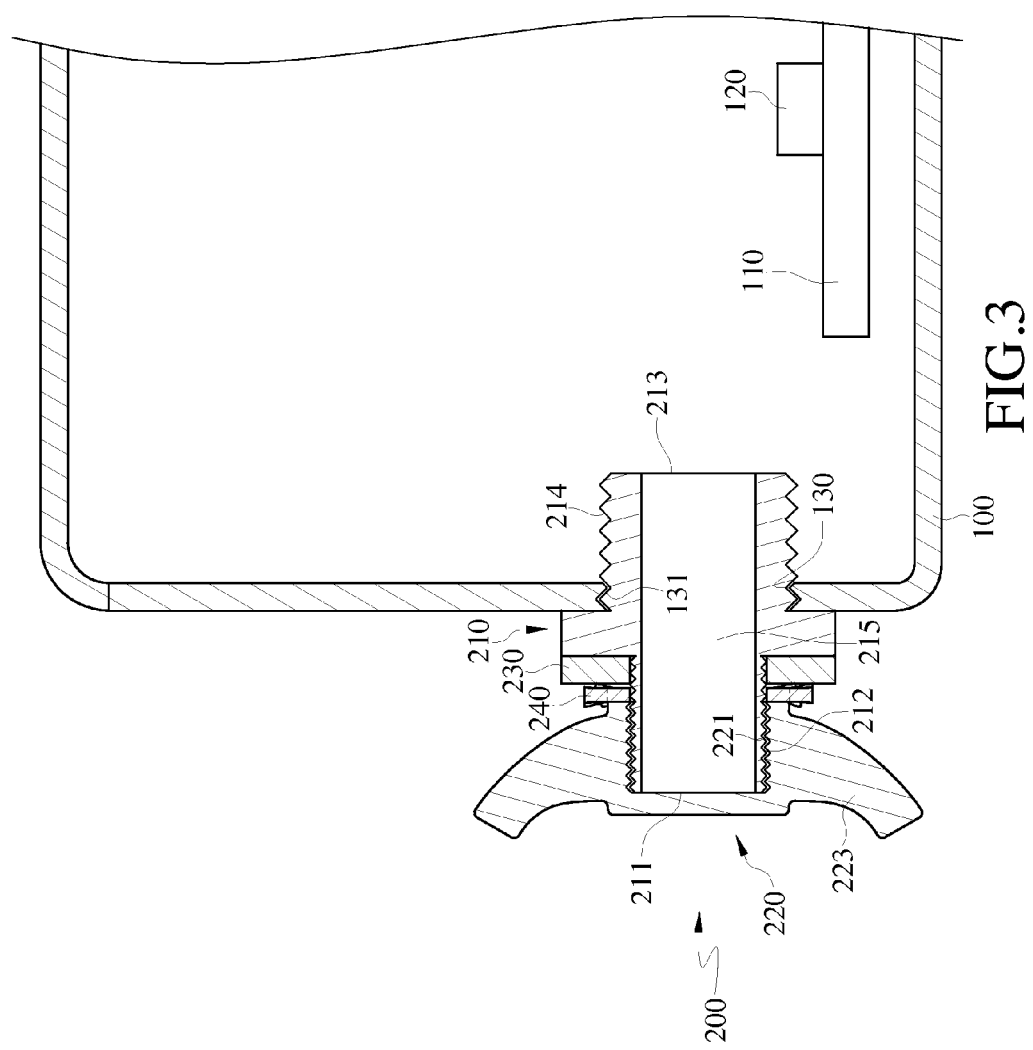
FIG. 3 is a cross-sectional view of a portion of the electronic device according to the first embodiment.

FIG. 1 is a three-dimensional view of an electronic device according to a first embodiment. FIG. 2 is an exploded view of a gas tightness testing member according to the first embodiment. FIG. 3 is a cross-sectional view of a portion of the electronic device according to the first embodiment. Referring to FIGS. 1 to 3, the electronic device 10 may be a ruggedized notebook, a radar positioning device, or a radio receiving device. In the first embodiment, the electronic device 10 is a ruggedized notebook.

The electronic device 10 of this embodiment comprises a casing 100 and a gas tightness testing member 200. The casing 100 has a key board and an electronic circuit device 110. The electronic circuit device 110 is, for example, a main board or a circuit board and comprises a ground loop 120. The ground loop 120 is electrically connected to the casing 100. At least one portion of the casing 100 is conductive. The casing 100 at least has a disposition hole 130 including an inner screw thread portion 131.

The gas tightness testing member 200 comprises a main body 210 and a cover body 220. The main body 210 is a cylindrical ground stud, and is conductive. The main body 210 comprises a first end 211 and a second end 213. The first end 211 has a first screw thread portion 212, and is exposed out of the casing 100. The second end 213 has a second screw thread portion 214. The main body 210 is screwed on the inner screw thread portion 131 with the second screw thread portion 214. Therefore, the main body 210 is electrically connected to the ground loop 120 through the second screw thread portion 214, the inner screw thread portion 131, and the casing 100. The manner for electrically connecting the casing 100 to the ground loop 120 is not the focus of this embodiment, and thus is not described in detail herein. The main body 210 is hollow and cylindrical. The main body 210 comprises a fluid channel 215 penetrating from the first end 211 to the second end 213, so that gas may flow between the interior and the exterior of the casing 100.

The cover body 220 of this embodiment has an inner bolt hole 221 in the form of a blind hole. The cover body 220 is selectively screwed on the first screw thread portion 212 with the inner bolt hole 221, for sealing the fluid channel 215, thereby reducing the opportunity of the external dust or moisture to enter the electronic device 10. For the purpose of ease of the operation by a user, in this and some embodiments, the cover body 220 has a force applied portion 223. The force applied portion 223 protrudes outside from a side surface of the cover body 220, so as to increase a force arm of the cover body 220.

In order to enable the cover body 220 to be tightly screwed on the main body, in this and some embodiments, the gas tightness testing member further comprises at least one gasket. The gas tightness testing member of this embodiment comprises a first gasket 230 and a second gasket 240, and the first gasket 230 is annular, sleeved on the first end 211 and located between the main body 210 and the cover body 220, so as to eliminate the allowance between the main body 210 and the cover body 220. The second gasket 240 has a senate edge, and is sleeved on the first end 211 and located between the first gasket 230 and the cover body 220, so as to enable the cover body 220 to be tightly screwed on the main body 210. However, the number of the gaskets and the order of the first gasket 230 and the second gasket 240 do not tend to limit the present invention. In some embodiments, the number of the gaskets and the order of the first gasket 230 and the second gasket 240 may be varied according to practical demands.

Figure 4:
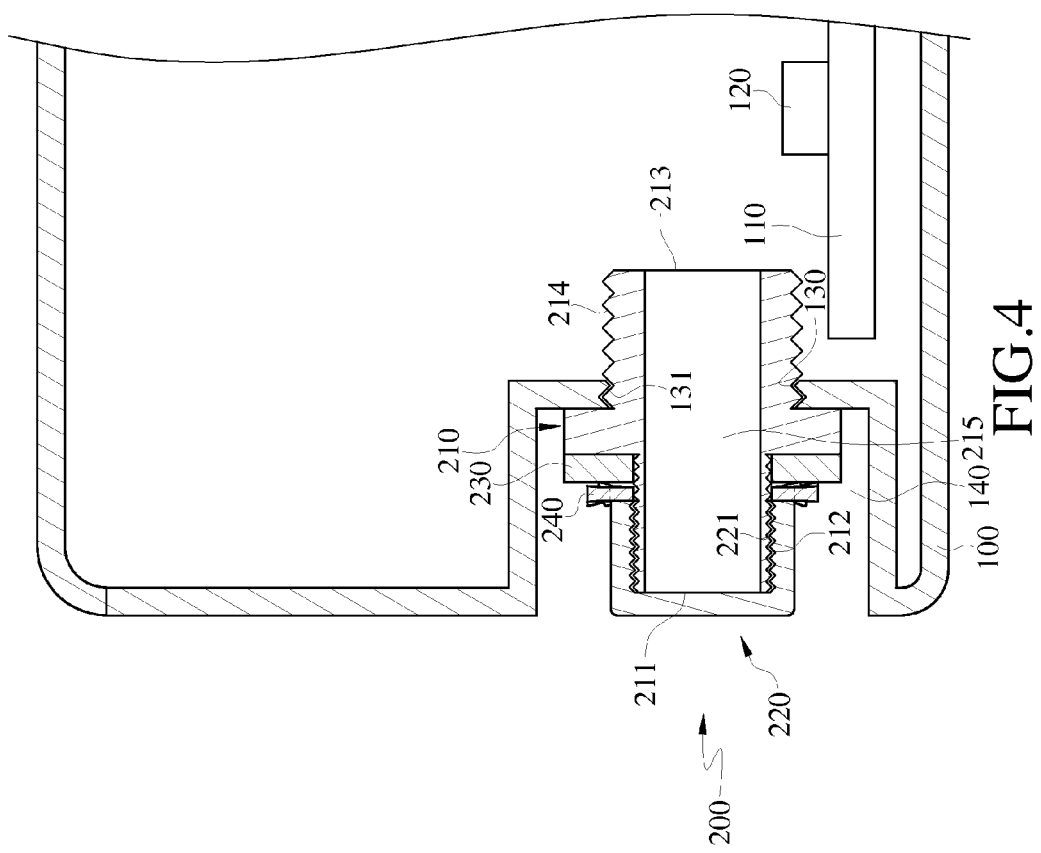
FIG. 4 is a partial cross-sectional view of an electronic device according to a second embodiment.
Figure 5:
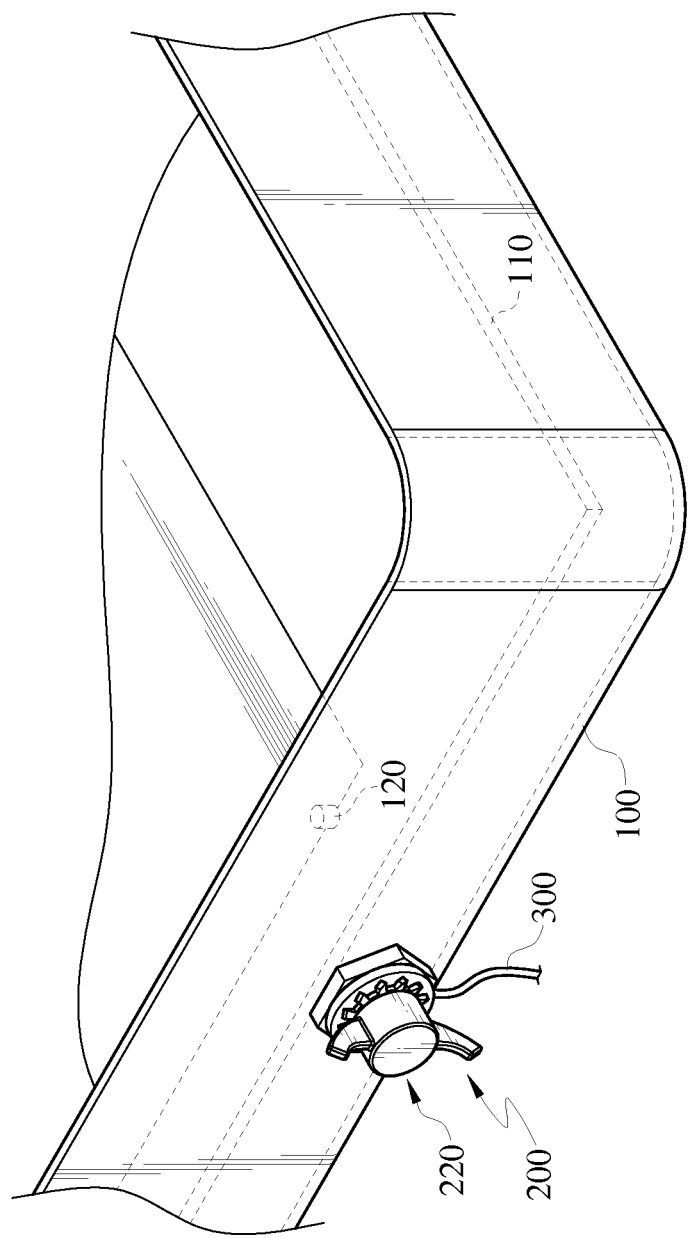
FIG. 5 is a three-dimensional view of grounding the electronic device according to the first embodiment.

FIG. 4 is a partial cross-sectional view of an electronic device according to a second embodiment. Referring to FIG. 4, in this embodiment, a groove 140 is formed on an external wall of the casing 100, and the disposition hole 130 is located on a bottom surface of the groove 140. When the gas tightness testing member 200 is assembled in the disposition hole 130, the entire gas tightness testing member 200 is in the groove 140. It should be noted that, when the gas tightness testing member 200 is in the groove 140, a side surface of the groove 140 may interfere with the ground wire 300 (as shown in FIG. 5), so that electrically connecting the ground wire 300 to the first end 211 of the main body 210 can not be achieved. Therefore, a space needs to be reserved the ground wire 300 in the groove 140.

In some embodiments, the cover body 220 is a hexagonal screw nut without the force applied portion 223. Therefore, an external tool, for example, a wrench (not shown), may be used, when the cover body 220 is screwed on the main body 210.

FIG. 5 is a three-dimensional view of grounding the electronic device according to the first embodiment. Referring to FIG. 5, when the electronic device 10 is in operation, the ground wire 300 may be electrically connected to the first end 211 of the main body 210. The inner bolt hole 221 of the cover body 220 is screwed on the first screw thread portion 212. The ground wire 300 is tightly clipped by the first gasket 230 and a second gasket 240, so as to prevent the ground wire 300 from falling off. Therefore, a surge of the electronic device 10 may be guided by the ground wire 300 to the ground, and the electronic device 10 may shield off the electromagnetic wave.

Figure 6:
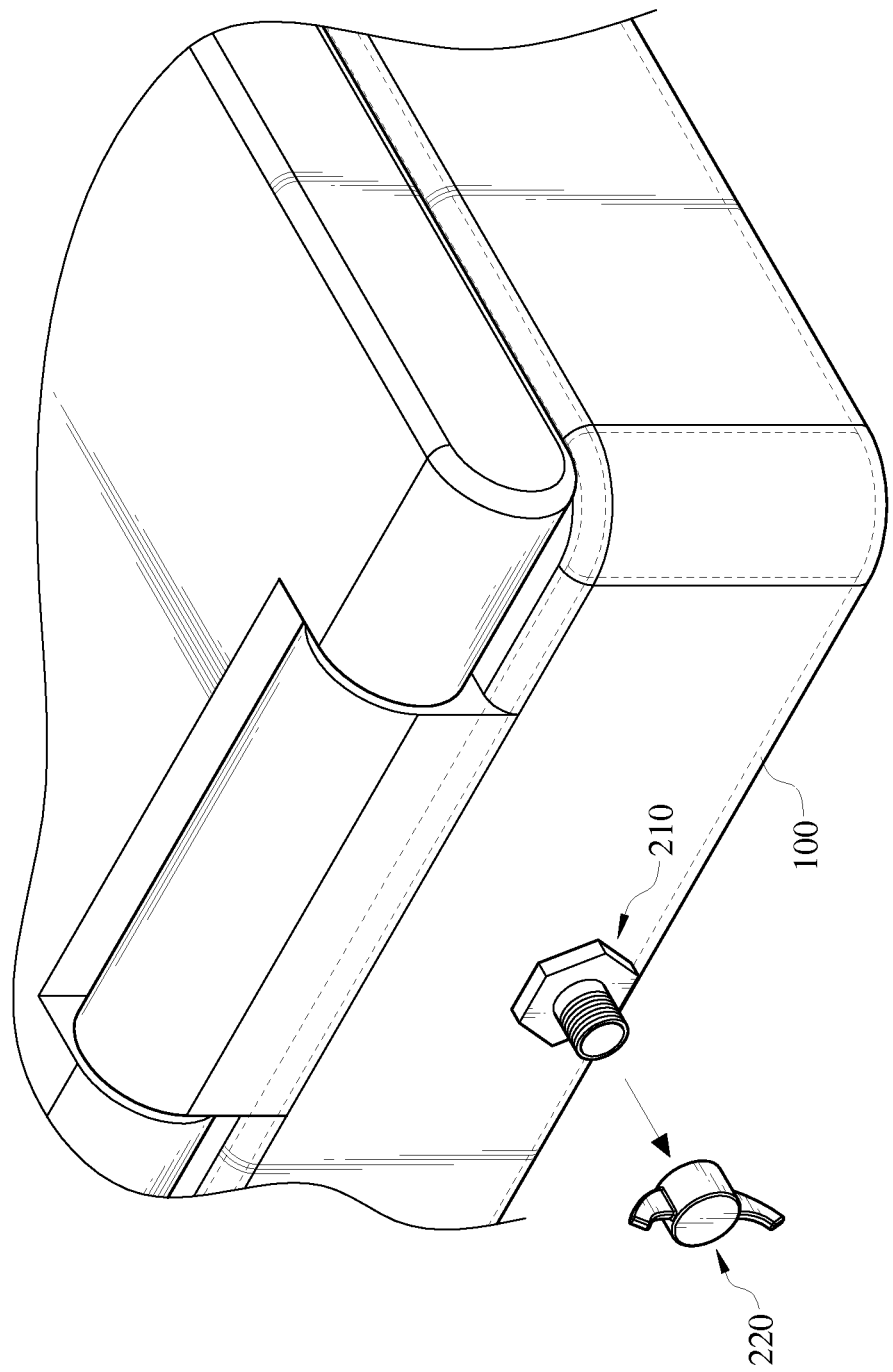
FIG. 6 is a three-dimensional view of taking a cover body from a main body according to the first embodiment.

FIG. 6 is a three-dimensional view of taking the cover body from the main body according to the first embodiment. Referring to FIG. 6, when a gas tightness test of the electronic device 10 is required, the cover body 220 is taken off from the main body 210, and thus the fluid channel 215 is exposed.

Figure 7:
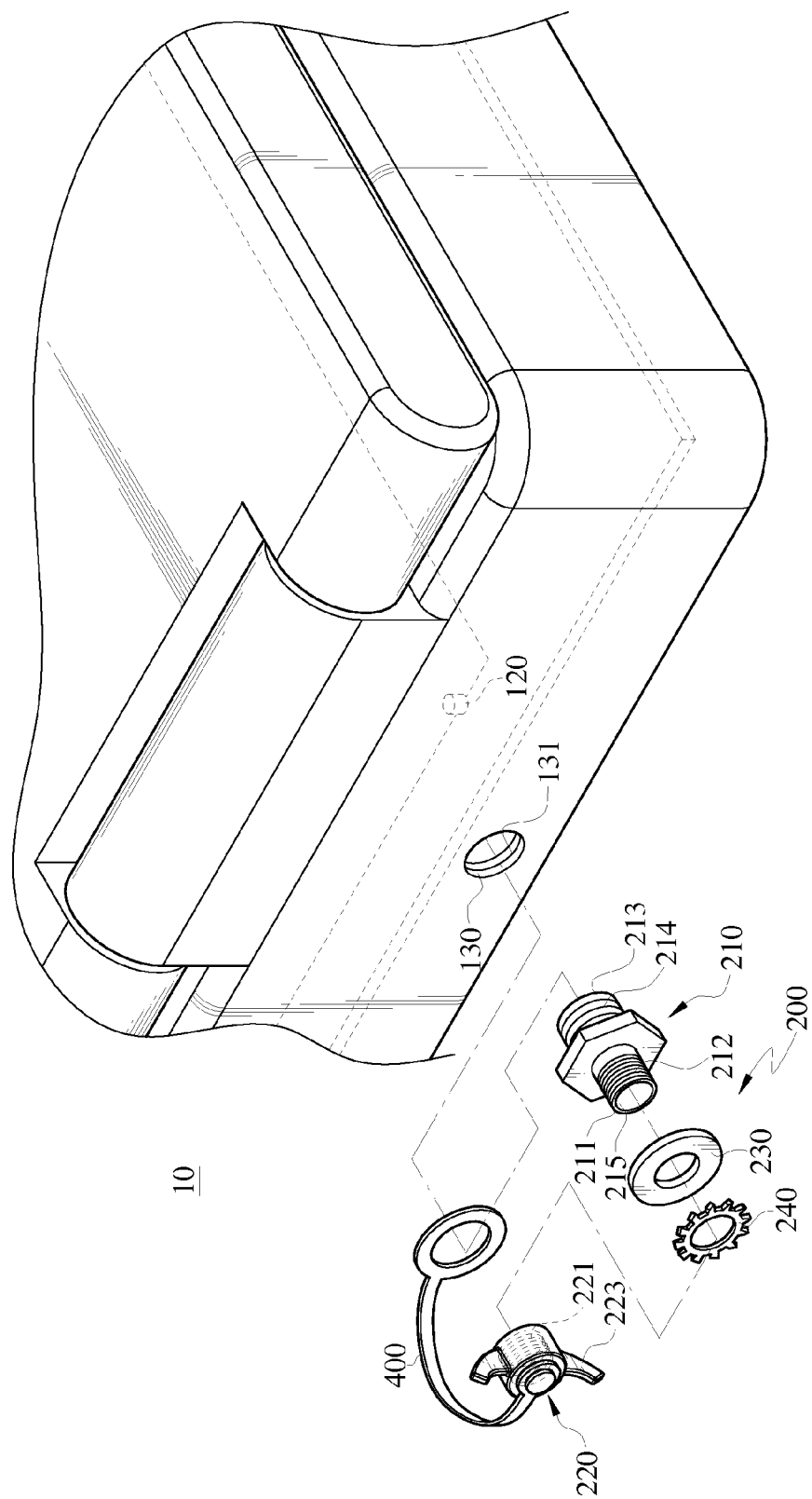
FIG. 7 is an exploded view of a gas tightness testing member according to a third embodiment.

FIG. 7 is an exploded view of the gas tightness testing member according to a third embodiment. Referring to FIG. 7, in addition, in order to prevent the cover body 200 from being lost after being taken off from the main body 210, a connection member 400 may be disposed between the main body 210 and the cover body 220 in this embodiment. One end of the connection member 400 is connected to the main body 210, and the other end is connected to the cover body 220. The connection member 400 of this embodiment may be a connection belt made from one piece of material as shown in FIG. 7, or may be a chain structure or a pivot structure.

Figure 8:
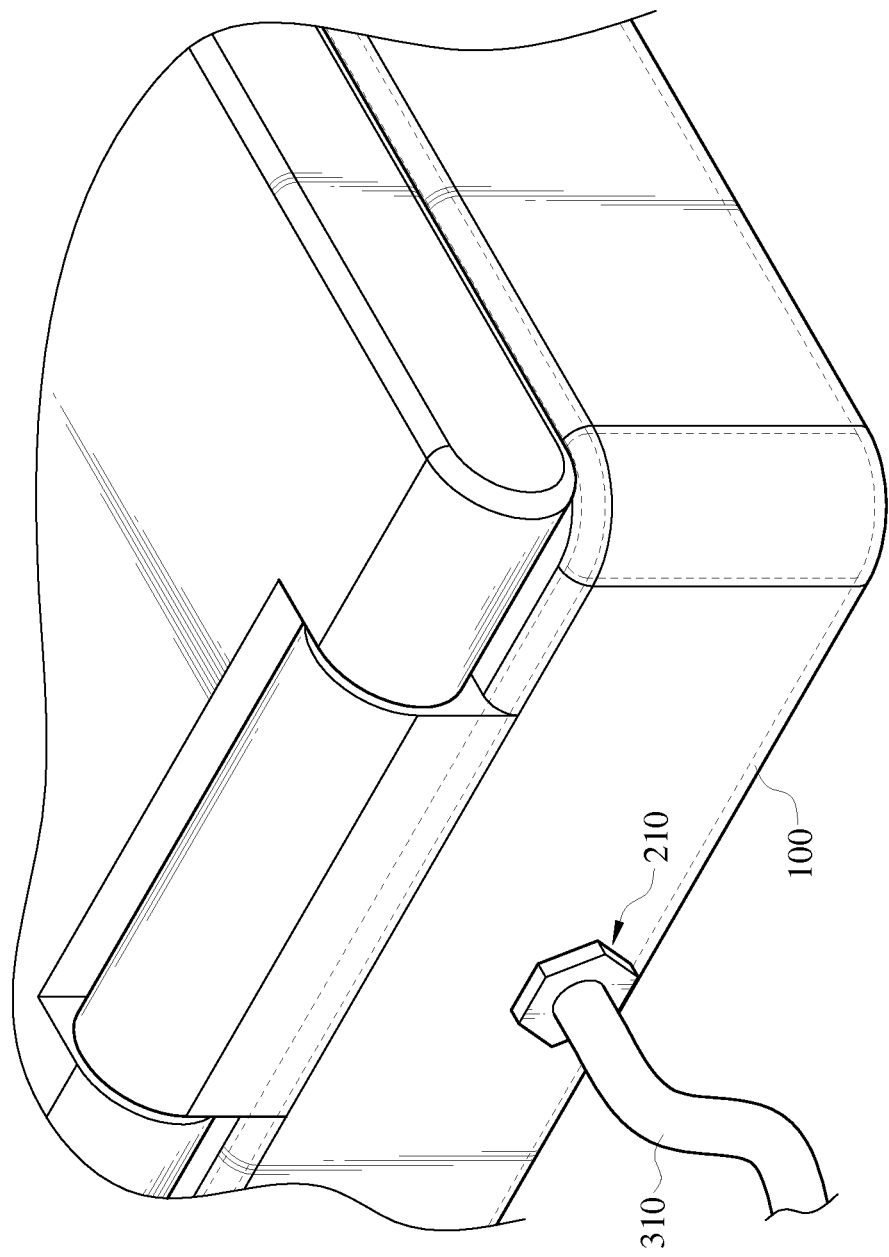
FIG. 8 is a three-dimensional view of the electronic device according to the first embodiment in a gas tightness test.

FIG. 8 is a three-dimensional view of the electronic device according to the first embodiment in the gas tightness test. Referring to FIG. 8, a gas tightness testing device (not shown) is connected to the fluid channel 215 via a hollow pipe 310. Then, a pressure difference is generated between the interior and the exterior of the casing 100 by using the gas tightness testing device (for example, by extracting or blowing gas), so as to test the gas tightness of the casing 100. If the pressure in the interior of the casing 100 reaches a preset standard value, it represents that the electronic device 10 has good gas tightness. Otherwise, it represents that the gas tightness of the electronic device 10 is insufficient. Herein, the standard value of the pressure does not fall in the discussion scope of the present embodiment, and thus is not further described in detail.

After the gas tightness test, the inner bolt hole 221 of the cover body 220 is again screwed back on the first screw thread portion 212, so as to seal the fluid channel 215. In addition, if the electronic device needs to be grounded after the gas tightness test, before the cover body 220 is screwed on the main body 210, the ground wire 300 may be further electrically connected to the main body 210. Then, the cover body 220 is screwed on the main body 210.

Figure 9:
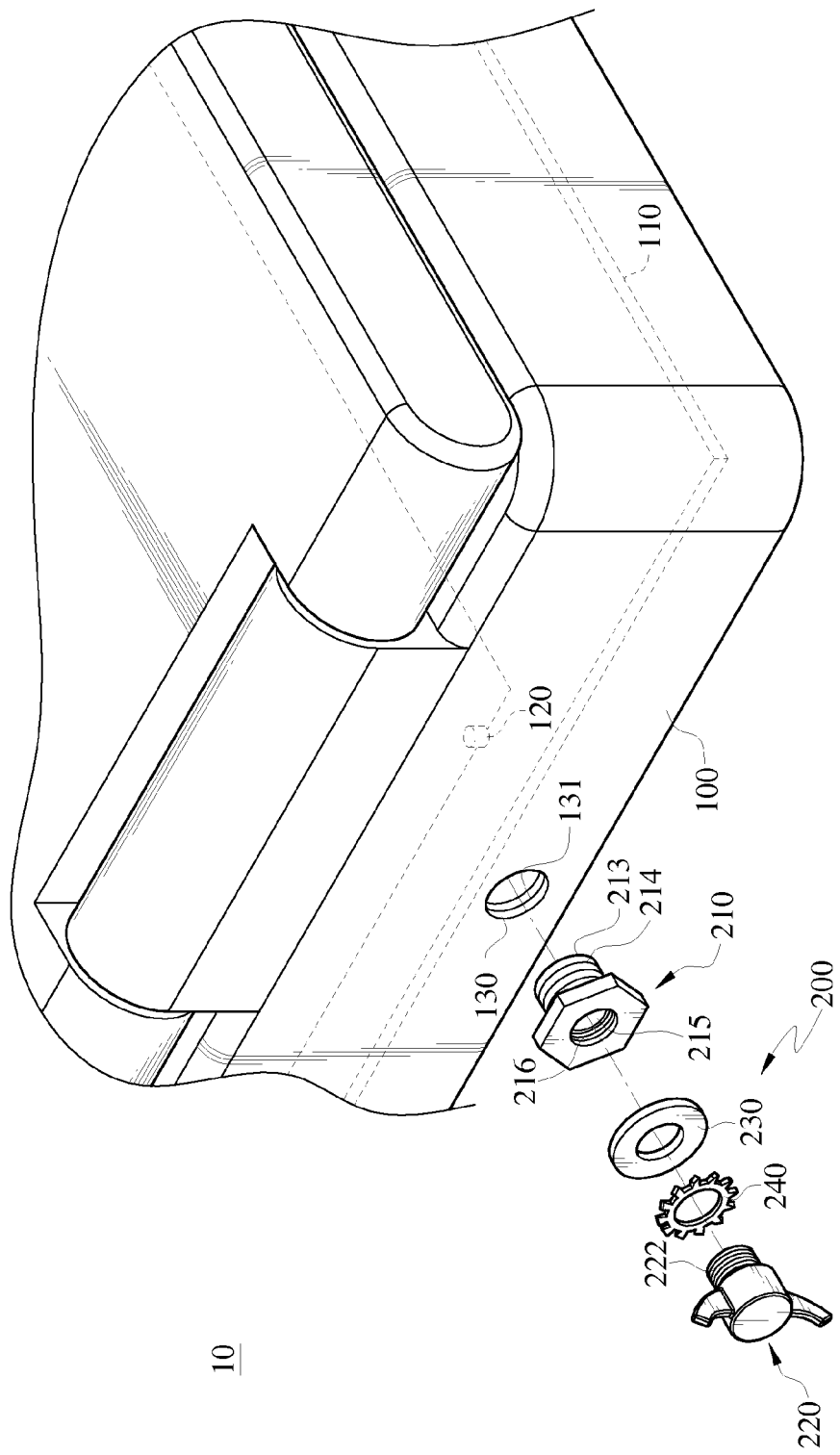
FIG. 9 is an exploded view of a gas tightness testing member according to a fourth embodiment.

FIG. 9 is a schematic exploded view of the gas tightness testing member according to a fourth embodiment. Referring to FIG. 9, the electronic device of this embodiment is substantially the same as those in the embodiments above, and exceptive features of this embodiment are described below.

The fluid channel 215 has an inner screw thread structure 216. The cover body 220 comprises a first screw bolt portion 222, and is screwed on the screw thread structure 216 with the first screw bolt portion 222, so as to seal the fluid channel 215.

According to the electronic device of the embodiments above, the gas tightness testing member can replace the conventional gas tightness testing opening and the ground stud. When the gas tightness test of the electronic device is required, the cover body of the gas tightness testing member is opened, and the fluid channel is exposed, so as to be connected to the gas tightness testing device. When the electronic device needs to conduct the ground loop, the cover body is combined with the main body, and connects the ground wire to the main body, so that the electronic device can shield off the electromagnetic interference.

What is claimed is:

1. A gas tightness testing member, comprising:
a conductive main body connected to a casing as a permanent part and having a first end and a second end, the main body having a fluid channel penetrating from the first end to the second end and communicating with an interior of the casing; and
a cover body, selectively combined with the first end of the main body for sealing the fluid channel, wherein the first end of the main body is connected to a ground wire for forming an electrical connection with the casing.

2. The gas tightness testing member according to claim 1, wherein the first end of the main body has a first screw thread portion, and the cover body has an inner bolt hole and is screwed on the first screw thread portion with the inner bolt hole.

3. The gas tightness testing member according to claim 1, wherein the fluid channel of the main body has an inner screw thread structure, and the cover body has a first screw bolt portion and is screwed on the inner screw thread structure with the first screw bolt portion.

4. The gas tightness testing member according to claim 1, wherein the first end of the main body protrudes out from the casing, and the second end is located in the casing.

5. The gas tightness testing member according to claim 1, further comprising a connection member, having one end connected to the main body, and the other end connected to the cover body.

6. An electronic device, comprising:
a casing, having an electronic circuit device in the housing, the electronic circuit device having a ground loop electrically connected to the casing, and the casing at least has a disposition hole; and
a gas tightness testing member connected to the disposition hole as a permanent part of the electronic device, and comprising:
a conductive main body, connected to the disposition hole and having a first end and a second end, the main body having a fluid channel penetrating from the first end to the second end and communicating with an interior of the casing, the first end is connected to a ground wire forming an electrical connection with the ground loop; and a cover body, selectively connected to the first end of the main body for sealing the fluid channel.

7. The electronic device according to claim 6, wherein the disposition hole is located in a groove of the casing.

8. The electronic device according to claim 6, wherein the first end of the main body is connected to a gas tightness testing device.

9. The electronic device according to claim 6, wherein the disposition hole has an inner screw thread portion, the second end of the main body has a second screw thread portion, and the main body is screwed on the inner screw thread portion with the second screw thread portion.

10. The electronic device according to claim 6, wherein the first end of the main body is exposed out of the casing, and the second end is located in the casing.

11. The electronic device according to claim 6, wherein the first end of the main body has a first screw thread portion, and the cover body has an inner bolt hole and is screwed on the first screw thread portion with the inner bolt hole.

12. The electronic device according to claim 6, wherein the fluid channel of the main body has an inner screw thread structure, and the cover body has a first screw bolt portion and is screwed on the inner screw thread structure with the first screw bolt portion.

13. The electronic device according to claim 6, wherein the first end of the main body is connected to a ground wire, so as to form electrical connection with the casing.

14. The electronic device according to claim 6, further comprising a connection member, having one end connected to the main body, and the other end connected to the cover body.

15. The electronic device according to claim 6, wherein the electronic device is a notebook computer.

* * * * *